No. 802,436. PATENTED OCT. 24, 1905.
H. B. VAN ORDER.
WATER METER ATTACHMENT.
APPLICATION FILED APR. 3, 1905.
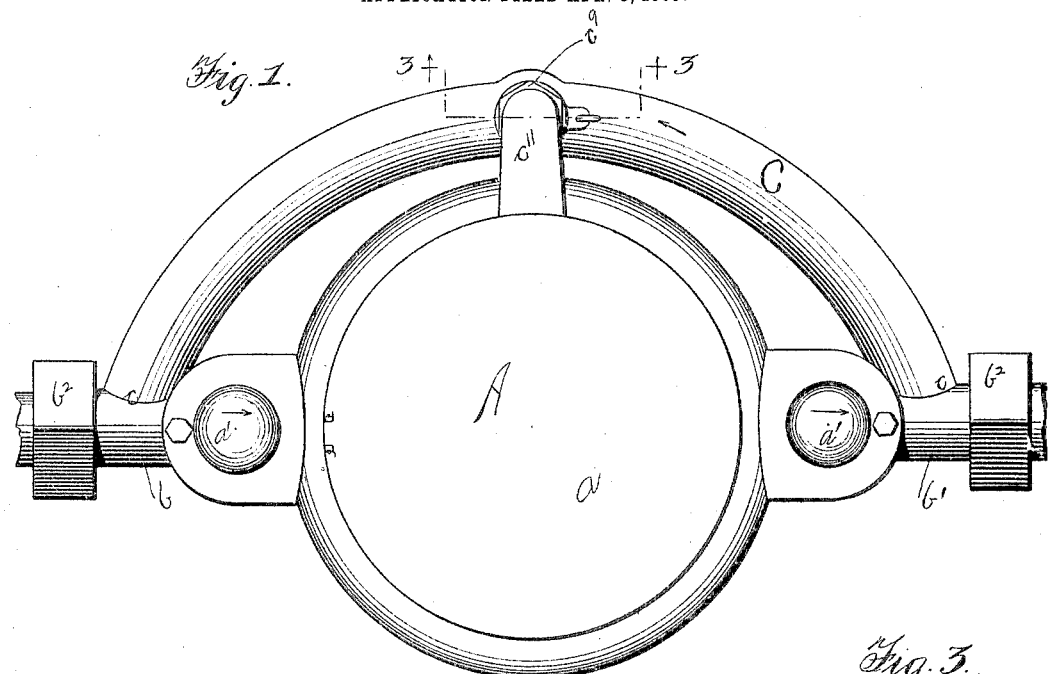
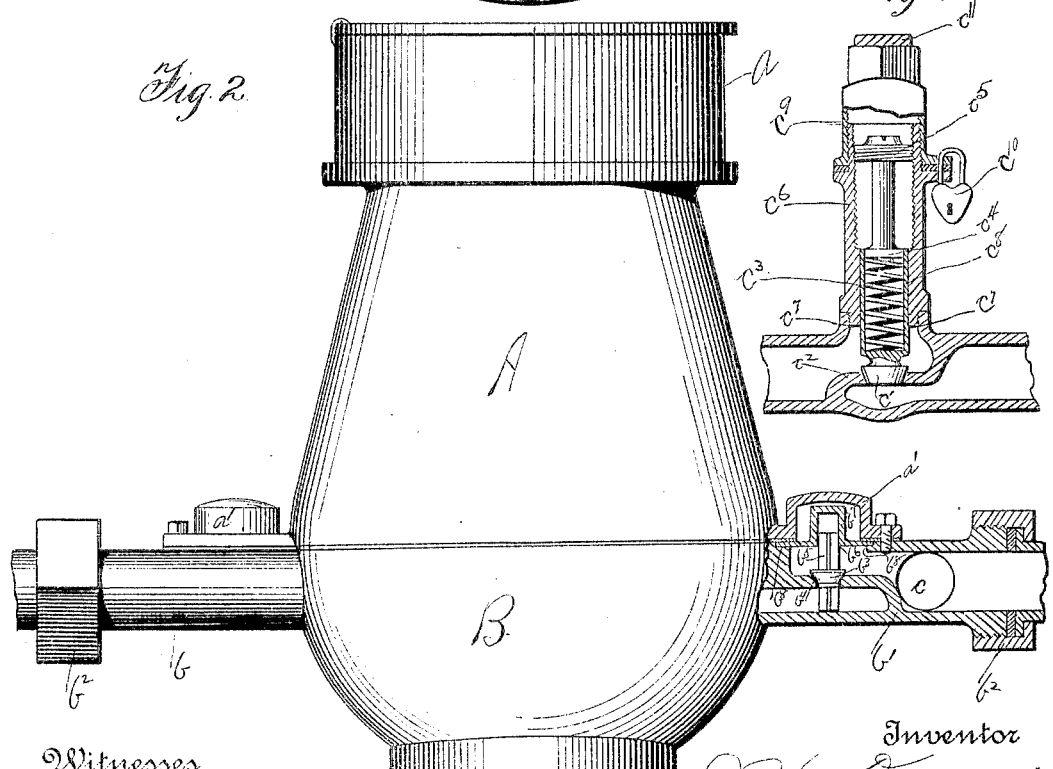
Witnesses
B. M. Holman.
Eugene Terry.
Inventor
Henry B. Van Order
By T. L. Bryant, Attorney

UNITED STATES PATENT OFFICE.

HENRY B. VAN ORDER, OF ITHACA, NEW YORK.

WATER-METER ATTACHMENT.

No. 802,436. Specification of Letters Patent. Patented Oct. 24, 1905.

Application filed April 3, 1905. Serial No. 253,386.

*To all whom it may concern:*

Be it known that I, HENRY B. VAN ORDER, a citizen of the United States, residing at Ithaca, in the county of Tompkins and State of New York, have invented certain new and useful Improvements in Water-Meter Attachments, of which the following is a specification.

My invention relates to certain new and useful improvements in water-meters, and relates to an attachment or arrangement of the water-circuit rather than to the specific construction of the meter *per se*.

The objects of my invention are several: first, to produce a meter of such construction that the supply will be stopped when the meter is reversed; second, that the supply of water will not only be stopped, but will be prevented from even entering the meter in the event of reversing the same; third, to provide a construction in which any backwater from the house will be carried away by a valved branch pipe acting independent of the inlet and outlet pipes of the meter; fourth, in which outlet-valve for any backwater from the house is adjustable so that the backwater can only flow through the independent outlet-pipe when its pressure exceeds the city pressure by a predetermined amount of pounds; fifth, in which in the event of reversing the meter no water from the main supply can enter the house through the backwater outlet-valve, since said valve can only be opened when the pressure in the house is greater than (not merely equal to) the supply-pressure, and, sixth, to provide a construction in which should the meter be reversed only a very limited supply of heated backwater from the house could enter the same, but sufficient to warp the vulcanized rubber disk and render the meter inoperative, so that the mechanism will not register when the meter is again restored to its proper position. In this way positive proof will be evident that the meter has been reversed at some time.

The advantages of the functions above set forth are self-evident. It is not only impossible to steal the water by reversing the meter, since the water-supply will be stopped, but in the event of reversing the meter the same will become inoperative, thereby proving an attempt to steal the water from the city supply. When in its proper position, the backwater, usually from the hot-water system of the house, cannot enter the meter and injure the same, as in the types now in use. The peculiar construction of the valve permits the flow of backwater therethrough to be regulated by the pressure of the same. The valve in the backwater-exit pipe will not open to the city supply when reversed, since its pressure against the seat exceeds the normal pressure of the city supply.

In carrying out the above functions and advantages I have constructed a device exceedingly simple and cheap to manufacture, which at the same time may be applied to any type of water-meter and in which no access can be had to the various valves employed without removing the casing and mechanism of the meter.

With the above and other objects in view, which will be apparent as the description proceeds, I will endeavor to more specifically define and claim my invention, reference being had to the accompanying drawings, forming a part of this specification, in which—

Figure 1 is a top plan view showing the meter provided with valved inlet and outlet ports and branch or by-pass pipe. Fig. 2 is a side elevation showing a preferable construction of check-valve located in the said inlet and outlet ports which I propose to use; and Fig. 3 is a detail section on the line 3 3 of Fig. 1 looking in the direction of the arrow, showing the construction of the adjustable check-valve in the by-pass pipe.

The registering mechanism is mounted in a casing formed in two sections—an upper section A and a lower section B—having their adjacent edges formed with an annular flange and secured together by bolts passing through the flanges. The section A is provided at its top with an annular chamber $a$, in which the registering mechanism is located and the reading of the meter indicated. The section B is provided with oppositely-disposed stub-pipes $b$ and $b'$, the pipe $b$ serving as the inlet-port from the city supply and the pipe $b'$ as the outlet-port to the house, these pipes being connected to the mains by unions $b^2$.

The stub-pipes $b$ and $b'$ are provided with check-valves $b^3$ adjacent the meter. In Fig. 2 one of the check-valves is shown in section, and the check-valve in the opposite pipe being of the same construction the description is equally applicable. The valve $b^3$ is mounted upon a valve-seat $b^4$, formed in the stub-pipe, the valve as shown being preferably of the wing type, although any other form would serve the function equally as well. The valve-stem $b^5$ projects through an opening $b^6$ in the stub-pipe, this opening being closed by a cup-shaped cap $b^7$. The section A is provided with oppositely-disposed lateral cup-shaped extensions $a'$, which are adjacent each valve and which when the sections are bolted together serve to clamp the cap $b^7$, resting on an annular seat $b^8$, surrounding the opening $b^6$ upon the stub-pipes $b$ and $b'$. In addition to the oppositely-disposed stub-pipes the section B is provided with a semicircular by-pass pipe C, communicating with each of said stub-pipes $b$ and $b'$ at a point $c$ between the valve $b^3$ and the union $b^2$. Centrally arranged in the by-pass pipe C is a check-valve $c'$, arranged to operate in a reverse direction to that of the valves $b^3$. The valve $c'$ is held tightly against its seat $c^2$ by a spiral spring $c^3$, whose tension is regulated by a plunger $c^4$, provided with a threaded head $c^5$, the plunger being mounted in an interiorly-threaded pipe-section $c^6$, threaded into an opening $c^7$ in the pipe C adjacent the valve $c'$, whose stem $c^8$ is hollow to receive the spring $c^3$ and projects through said opening into the pipe-section $c^6$. The said pipe-section is closed by a cap $c^9$, threaded thereupon, which is locked from removal to obtain access to the valve to maliciously tamper with the same by a padlock or other form of seal $c^{10}$. An additional locking means comprising an overhanging arm $c^{11}$, inclosing said cap and carried by the section A, adjacent its upper end, may also be employed.

In operation the water will flow from the city supply through the valve in the inlet-pipe $b$, the meter, and the valve in the outlet-pipe $b'$ to the house-main. The valve $c'$ in the branch pipe C being oppositely arranged will be closed against the city supply. Should the heated water from the hot-water system of pipes back up, it will flow in a reverse direction to the city supply, and hence the valves $b^3$ will be closed against this backwater to prevent the same from entering the meter, the backwater flowing through the by-pass pipe C, but not passing the valve $c'$ until its pressure exceeds the city pressure and becomes greater than the pressure of the spiral spring $c^3$, when the valve $c'$ will open and allow the backwater to flow therethrough. The pressure at which the valve $c'$ will open—say, for instance, normally ten pounds above the city pressure—can be regulated by moving the plunger $c^4$ up to decrease the tension of the spring $c^3$ and lower the degree of pressure required to open the valve $c'$, or, vice versa, by moving the plunger down and increasing the tension of the spring $c^3$ and raising the degree of pressure required to open the valve $c'$. This arrangement of check-valve at the inlet and outlet ports of the meter and in the by-pass pipe serves not only to protect the meter against the destructive action of the heated water from the hot-water system of the house, but at the same time by permitting the backwater to have egress at a predetermined degree of pressure through the by-pass pipe C serves to eliminate all danger of damage from explosion. Should the position of the meter be reversed in an attempt to register backward and steal the water from the city, the valves $b^3$, being, of course, reversed, will be closed against the city supply. Although the valve $c'$ when it is reversed is in position to be opened by the city supply, this never occurs, since the pressure of the spring $c^3$ upon said valve exceeds the normal city pressure by some predetermined amount—as, for instance, ten pounds. The valves $b^3$ in the reversed position of the meter are in position to be operated by the heated backwater from the house. However, owing to the air-pressure in the meter and the pressure of the city supply (which will be against the valve in the stub-pipe $b'$ in the reverse position of the meter) only a very limited amount of heated backwater can enter the meter through the valves $b^3$, but sufficient to warp the vulcanized-rubber operating-disk and render the same inoperative, so that when the meter is restored to its proper position water will flow therethrough, but will not operate the registering mechanism, and the meter failing to register this will be proof that the same has been reversed at some time. It is impossible to remove any of the valves without removing the section A and the operating mechanism, and it is impossible to have access to the valve $c'$ in the branch pipe C without breaking the seal $c^{10}$. Hence any removal of the valves to steal the water necessitates the removal of the operating mechanism.

Various other changes may be made without departing from the scope of my invention as defined in the following claims, the essential feature of my invention being the provision of check-valves at the inlet and outlet ports of the meter, the provision of by-pass pipes independent of the meter and communicating with the supply-pipes adjacent said check-valves, and the provision of a regulating check-valve in said by-pass pipe.

Having fully described my invention, I claim—

1. In a liquid-meter, in combination with the casing and operating mechanism, check-valves located adjacent the inlet and outlet ports of said meter and an independent by-pass pipe communicating with said adjacent valved inlet and outlet ports and provided with an intermediate check-valve, operated from a reverse direction, to the valves in said inlet and outlet ports.

2. In a liquid-meter, in combination with the casing and operating mechanism, check-valves located adjacent the inlet and outlet ports of said meter, and an independent by-pass pipe communicating with said adjacent valved inlet and outlet ports and provided with an adjustable check-valve operated from a reverse direction to the valve in said inlet and outlet ports.

3. In a liquid-meter, in combination with the casing, and operating mechanism, check-valves located adjacent the inlet and outlet ports of said meter and an independent by-pass pipe communicating with said adjacent valved inlet and outlet ports and provided with a tension-controlled check-valve operated from a reverse direction to the valves in said inlet and outlet ports and means for regulating the tension of said valve.

4. In a liquid-meter, in combination with the casing and operating mechanism, means for allowing the liquid to flow in only one direction through said meter, and means carried by said casing and independent of said meter for exhausting and controlling the flow of liquid in a reverse direction than that assumed when flowing through the meter.

5. A casing for liquid-meters comprising a plurality of separable sections clamped together, valved inlet and outlet pipes carried by one of said sections, a valved by-pass pipe communicating with said inlet and outlet pipes at each end and extensions carried by the opposed sections and overlying said valves when the sections are clamped together.

In testimony whereof I affix my signature in presence of two witnesses.

HENRY B. VAN ORDER.

Witnesses:
B. M. HOLMAN,
T. K. BRYANT.